Sept. 11, 1956        H. E. TEMPLE        2,762,487
CONVEYOR SYSTEM WITH ARTICLE TRANSFERRING APPARATUS
Filed Oct. 27, 1951        7 Sheets-Sheet 1
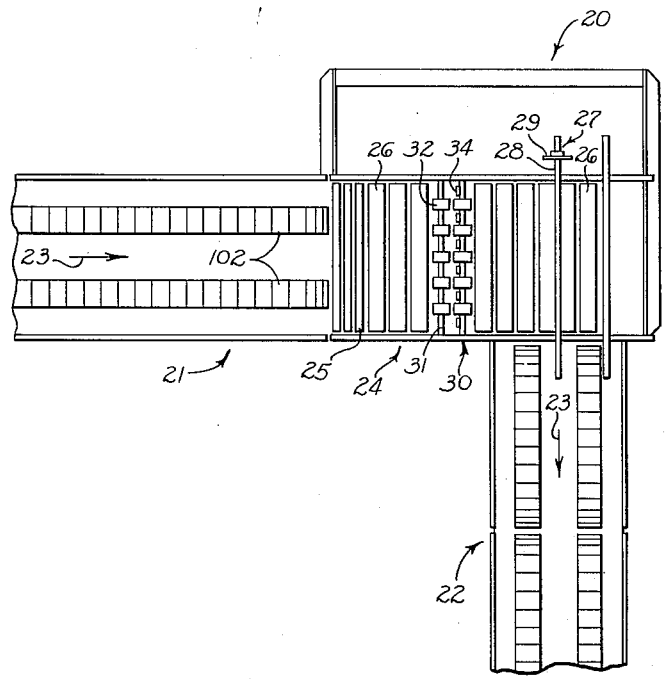
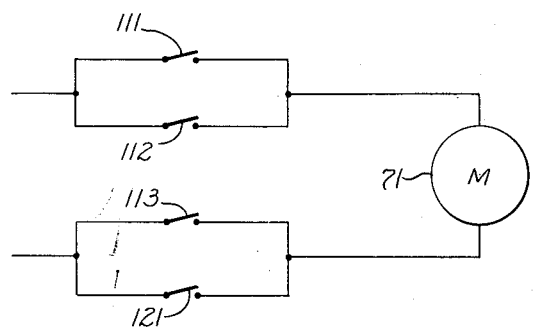
INVENTOR.
HIRAM E. TEMPLE
BY HIS ATTORNEYS.
HARRIS, KIECH, FOSTER & HARRIS

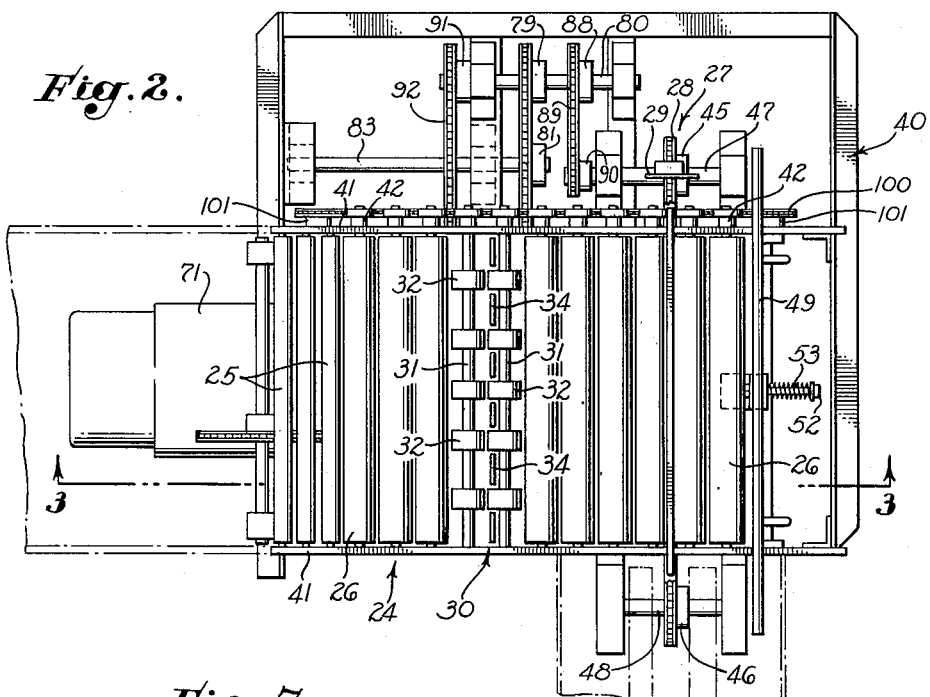
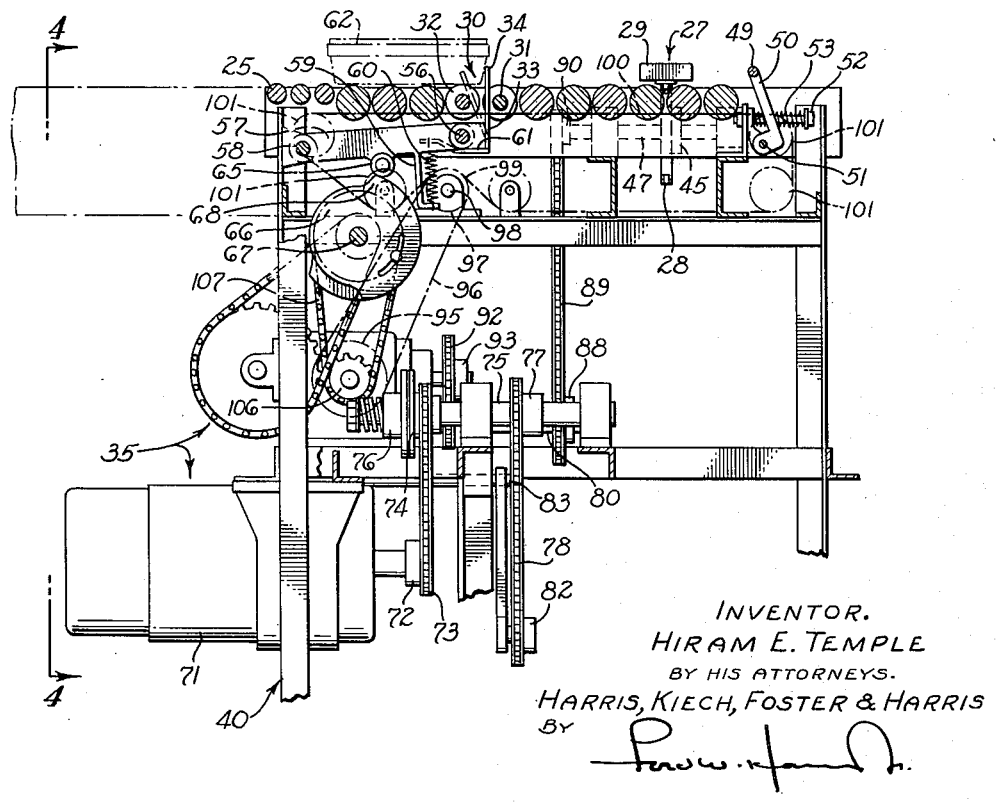

Sept. 11, 1956  H. E. TEMPLE  2,762,487
CONVEYOR SYSTEM WITH ARTICLE TRANSFERRING APPARATUS
Filed Oct. 27, 1951  7 Sheets-Sheet 3

INVENTOR.
HIRAM E. TEMPLE
BY HIS ATTORNEYS.
HARRIS, KIECH, FOSTER & HARRIS

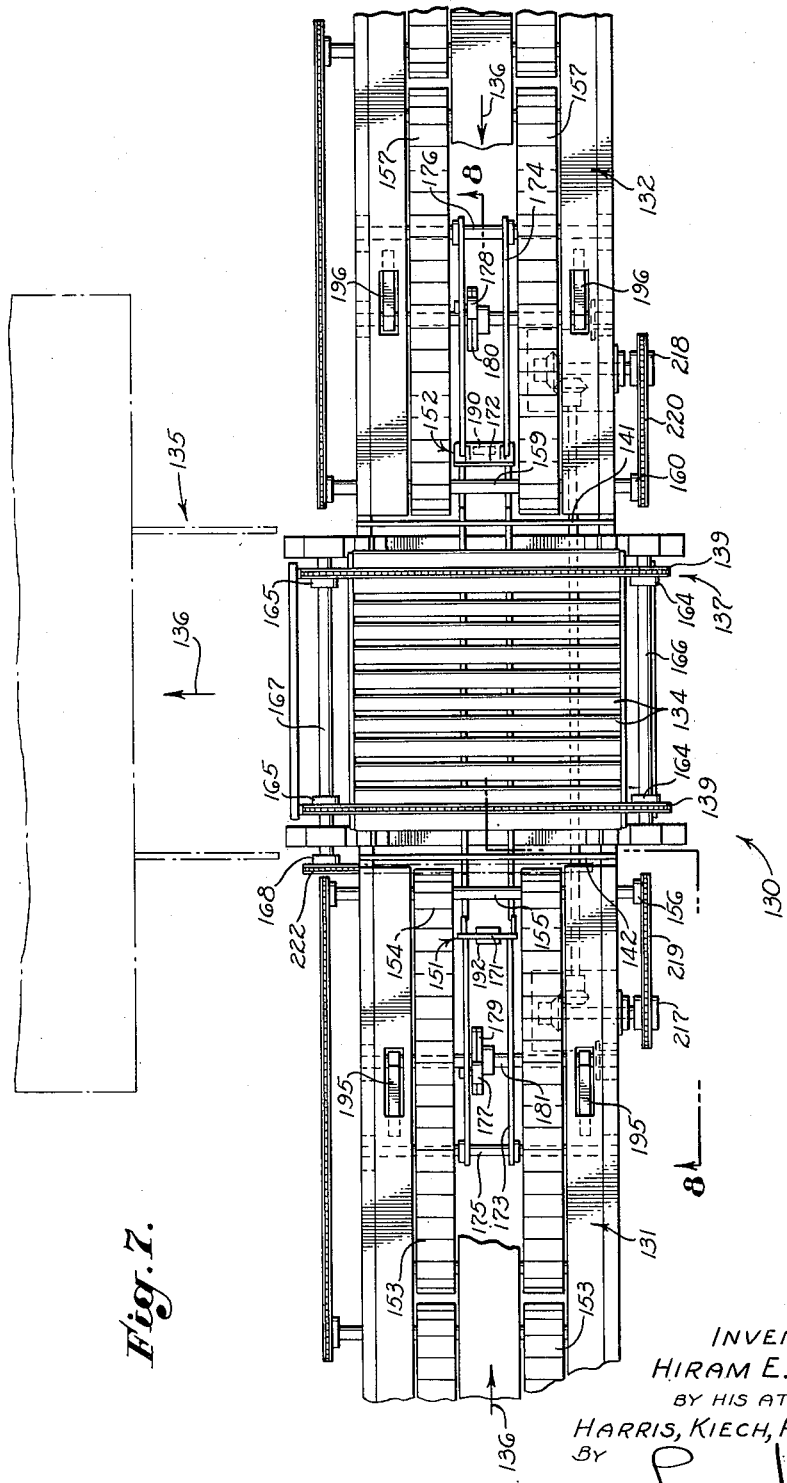

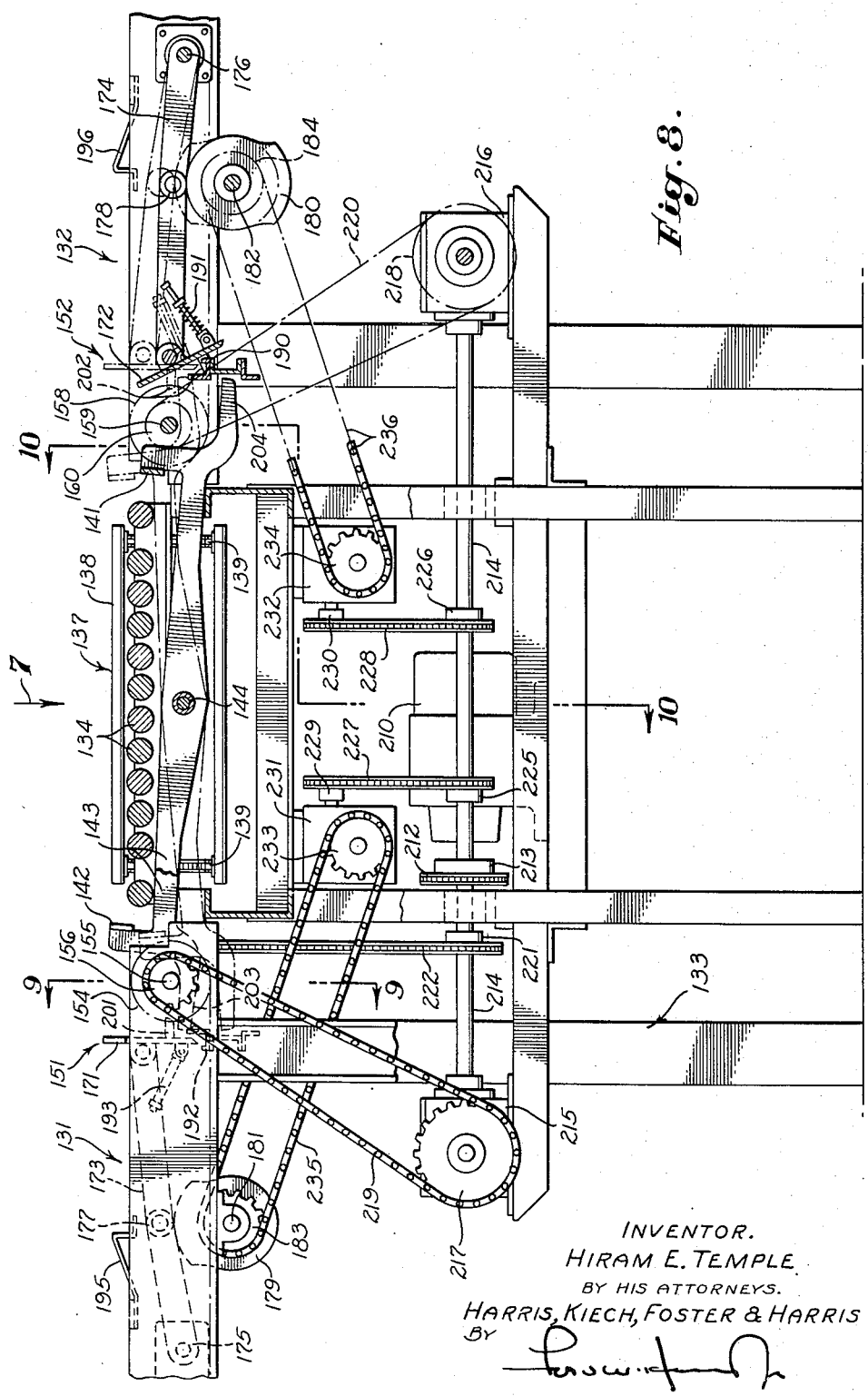

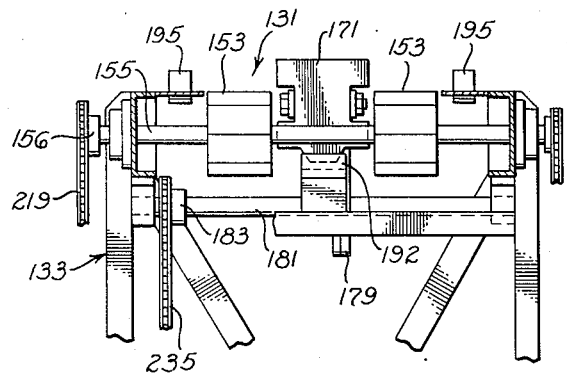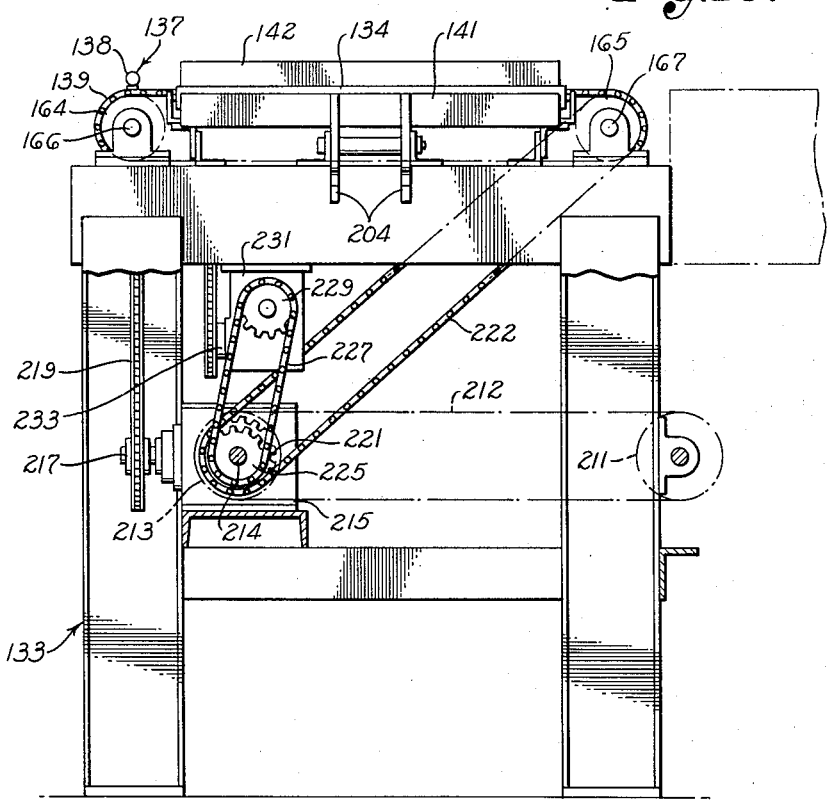

INVENTOR.
HIRAM E. TEMPLE
BY HIS ATTORNEYS.
HARRIS, KIECH, FOSTER & HARRIS

United States Patent Office 2,762,487
Patented Sept. 11, 1956

2,762,487

CONVEYOR SYSTEM WITH ARTICLE TRANSFERRING APPARATUS

Hiram E. Temple, San Gabriel, Calif., assignor to Read Standard Corporation, a corporation of Delaware Application October 27, 1951, Serial No. 253,525

8 Claims. (Cl. 198—21)

The present invention relates in general to conveyor systems and, more particularly, to a conveyor system having inlet and outlet conveyors arranged at right angles and having transfer means movable transversely of the inlet conveyor and in the direction of movement of the outlet conveyor for transferring successive articles from the inlet conveyor to the outlet conveyor. While the invention finds particular utility in the baking industry for handling such articles as baking pans or pan straps, for example, and is considered hereinafter in such connection as a matter of convenience, it will be understood that the invention is also susceptible of other applications and that I do not intend to be limited to the specific applications considered hereinafter.

A primary object of the invention is to provide a conveyor system of the character hereinbefore suggested which includes escapement means associated with the inlet conveyor upstream from the transfer means for passing but one article at a time to the transfer means and which includes actuating means operatively connected to the transfer means and the escapement means for operating the transfer means and the escapement means in timed relation. A related object is to provide an escapement means which includes a gate movable between an extended position wherein it is disposed in the path of an article being transported by the inlet conveyor and a retracted position wherein it is disposed out of such path, the gate being moved between its extended and retracted positions in timed relation with the operation of the transfer means.

Another object is to provide means associated with the escapement means for spacing an article being passed by the escapement means from a following article.

Another object is to provide an inlet conveyor having a section which includes spaced rolls, or other spaced conveyor elements, and to provide a transfer means which includes an endless chain having an upper run between such rolls and carrying a sweep for moving an article engaged thereby from the inlet conveyor to the outlet conveyor.

Another object is to provide a conveyor system which includes variable-speed drive means operatively connected to the transfer means for accelerating the transfer means from a relatively low speed to a relatively high speed as it crosses the inlet conveyor. Causing the transfer means to move at a relatively low speed in this manner as it begins to cross the inlet conveyor minimizes jarring of an article on the inlet conveyor as it is engaged by the transfer means, which is an important feature where the conveyor system is handling such delicate articles as pans or pan straps containing raised dough. The subsequent acceleration of the transfer means as it continues across the inlet conveyor minimizes the time required to transfer the article to the outlet conveyor so that the system can handle articles following each other in rapid succession, which is an important feature.

Another object is to provide a variable-speed drive means for the transfer means which includes an eccentric sprocket around which the endless chain carrying the sweep of the transfer means is trained, the eccentricity of the drive sprocket producing the desired acceleration of the sweep from a relatively low speed to a relatively high speed as the sweep crosses the inlet conveyor.

Another object is to provide means for preventing retraction of the gate of the escapement means when no article is being pressed against the gate by the inlet conveyor. Such means for preventing retraction of the gate when no article is pressing thereagainst insures feeding articles to the transfer means in timed relation with the operation of the transfer means so that an article cannot strike the transfer means as it is moving across the inlet conveyor, which is an important feature.

Another object is to provide latch means releasable in response to the pressure of an article against the gate of the escapement means for preventing retraction of the gate in the absence of pressing thereagainst by an article on the inlet conveyor.

Another object is to provide switch means engageable by the gate in response to the pressure of an article thereagainst and connected in circuit with the actuating means for the escapement means so as to prevent retraction of the gate in the absence of pressure thereagainst by an article on the inlet conveyor.

Another object is to provide a pair of inlet conveyors disposed on opposite sides of an outlet conveyor and running toward the outlet conveyor so that articles may be delivered to the outlet conveyor by both inlet conveyors.

An object in connection with the conveyor system suggested in the preceding paragraph is to provide transfer means for transferring articles from the two inlet conveyors to the outlet conveyor, and to provide two escapement means respectively associated with the inlet conveyors and each adapted to pass one article at a time to the transfer means. A related object is to provide means for operating the two escapement means in alternating relation and in timed relation with the transfer means so that an article is delivered to the transfer means from one inlet conveyor at a time.

Another object in connection with this double-inlet conveyor system is to provide alternately operating stops for intercepting articles passed to the transfer means by the respective escapement means and to provide means for operating said stops in alternating relation and in timed relation with the operation of the two escapement means.

Another object is to provide a conveyor system which includes two inlet conveyors in side-by-side relation and an outlet conveyor extending transversely of the inlet conveyors, such conveyor system including transfer means for transferring articles from the inlet conveyors to the outlet conveyor and including two escapement means respectively associated with the inlet conveyors and operating in alternating relation for passing an article to the transfer means from one of the inlet conveyors at a time.

Another object is to provide counting means for counting the number of articles passed by the escapement means.

The foregoing objects and advantages of the present invention, together with various other objects and advantages thereof which will become apparent, may be attained with the exemplary embodiments of the invention which are described in detail hereinafter and which are illustrated in the accompanying drawings. Referring to the drawings:

Fig. 1 is a plan view of a conveyor system with article transfer means which embodies the invention;

Fig. 2 is an enlarged plan view of the transfer means of Fig. 1;

Fig. 3 is a sectional view taken along the arrowed line 3—3 of Fig. 2;

Fig. 6 is a schematic electrical diagram of the embodiment of Figs. 1 to 5;

Fig. 7 is a plan view of another embodiment of the invention;

Fig. 8 is a sectional view taken along the arrowed line 8—8 of Fig. 7;

Figure 11:
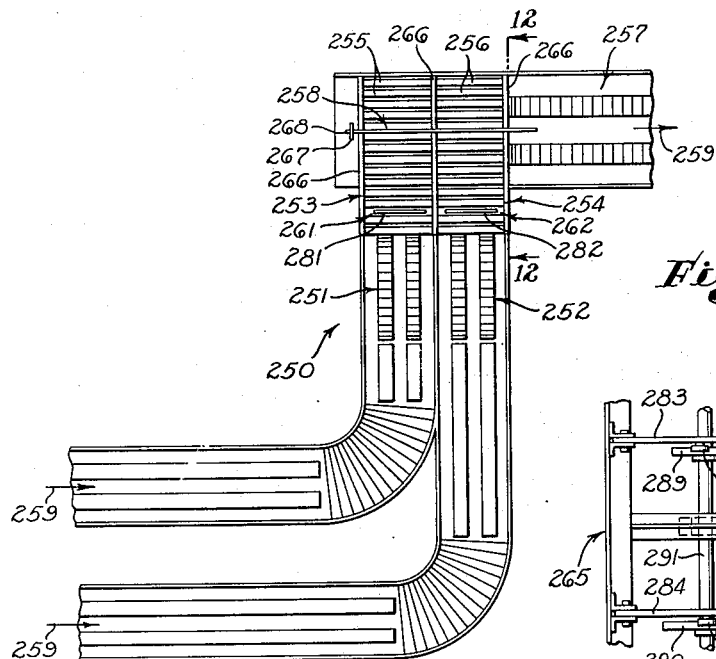
Figure 13:
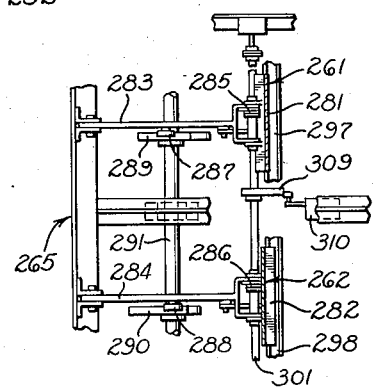
Figure 12:
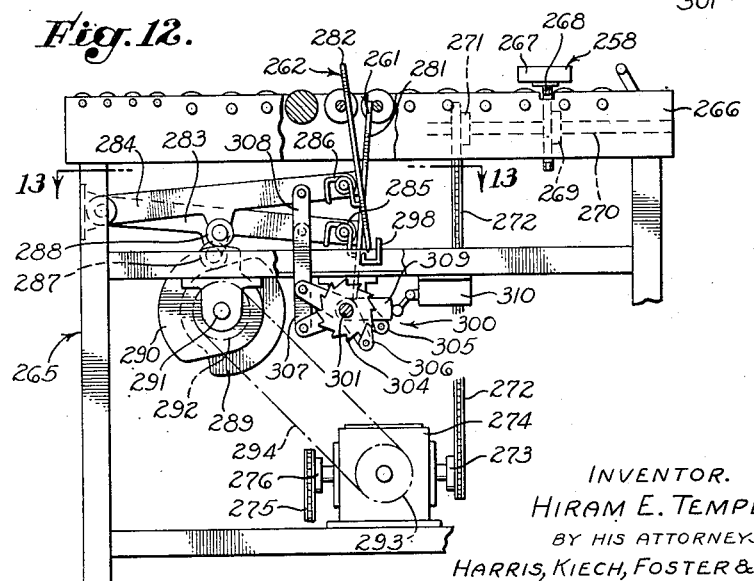

Figs. 9 and 10 are sectional views respectively taken along the arrowed lines 9—9 and 10—10 of Fig. 8;

Fig. 11 is a plan view of another embodiment of the invention;

Fig. 12 is an enlarged, fragmentary sectional view taken along the arrowed line 12—12 of Fig. 11; and Fig. 13 is a fragmentary sectional view taken along the arrowed line 13—13 of Fig. 12.

Referring particularly to Fig. 1 of the drawings, the conveyor system of the invention which is illustrated therein is indicated generally by the numeral 20 and includes an inlet conveyor 21 and an outlet conveyor 22, the outlet conveyor extending transversely of the inlet conveyor and being adapted to receive articles therefrom. The arrows 23 indicate the directions of movement of the inlet and outlet conveyors 21 and 22. The inlet conveyor 21 includes a section 24 which includes idling or gravity rolls 25 and driven rolls 26, the latter being driven in a manner to be described hereinafter. The outlet conveyor 22 registers with those driven rolls 26 which define the downstream end of the inlet conveyor 21.

The conveyor system 20 also includes transfer means 27 movable transversely of the inlet conveyor 21 and in the direction of movement of the outlet conveyor 22 for transferring successive articles from the inlet conveyor to the outlet conveyor, the transfer means comprising an endless chain 28 which carries a sweep 29 and the upper run of which is disposed between two of the driven rolls 26 at a level below the upper surfaces of the driven rolls. Thus, the chain 28 runs under an article being transferred to the outlet conveyor 22 by the sweep 29. Associated with the inlet conveyor 21 upstream from the transfer means 27 is an escapement means 30 for feeding articles to be transferred to the transfer means one at a time. In the particular construction illustrated, two of the driven rolls 26 comprise shafts 31 carrying spaced roll segments 32, the escapement means including a discontinuous gate 33 having upwardly extending fingers 34 disposed in the spaces between the roll segments 32. As will be discussed in more detail hereinafter, the gate 33 is movable between an extended position wherein the fingers 34 are disposed in the path of an article on the inlet conveyor 21 to intercept such article, and a retracted position wherein they are withdrawn downwardly out of such path to permit the article to pass to the transfer means 27. As will also be described in detail hereinafter, an actuating means 35, Figs. 2 to 4, is provided for operating the transfer means 27 and the escapement means 30 in timed relation so that the escapement means passes an article to the transfer means only after the transfer means has transferred a preceding article to the outlet conveyor 22 and before the transfer means is in a position to transfer the succeeding article.

Figure 4:
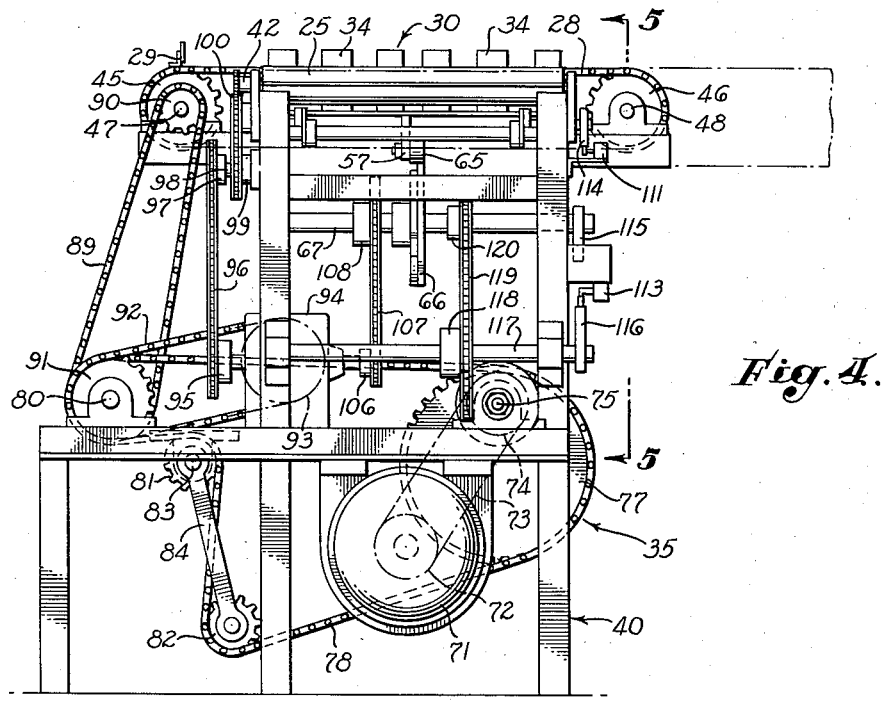
Fig. 4 is a sectional view taken along the arrowed line 4—4 of Fig. 3.

Referring particularly to Figs. 2 to 4 of the drawings, the inlet conveyor section 24, the transfer means 27, the escapement means 30 and the actuating means 35 are carried by a frame which is designated generally by the numeral 40. The frame 40 includes two parallel frame members 41 on which the respective ends of the idling rolls 25 and the driven rolls 26 are rotatably mounted in any suitable manner, not shown. One end of each driven roll 26 extends through one of the frame members 41 and carries a sprocket 42, the sprockets 42 being driven in a manner to be described so as to drive the driven rolls 26.

The chain 28 which carries the sweep 29 of the transfer means 27 is trained around sprockets 45 and 46 fixed on shafts 47 and 48, respectively, which are carried by suitable bearings on the frame 40. The sprockets 45 and 46 are so positioned that the upper run of the chain 28 is disposed between two of the driven rollers 26 but below the upper surfaces thereof so that an article supported by the driven rollers in the path of the sweep 29 is not engaged by the chain 28, but only by the sweep. Thus an article on the driven rolls in the path of the sweep 29 remains stationary until the sweep comes around and engages the article, a stop or bumper 49 being provided to keep the driven rolls 26 from moving the article off the end of the conveyor 21. The bumper 49 comprises a bar which extends across the downstream end of the inlet conveyor 21 and which is carried by an arm 50 pivoted to the frame 40 at 51. A bolt 52 carried by the frame 40 extends through the arm 50 of the bumper 49 and carries springs 53 on opposite sides of the arm 50 for cushioning each article as it is brought to a stop by the bumper 49, the latter yielding as it intercepts each article because of the presence of the springs 53.

The gate 33 is pivoted at 56 on an arm 57 which, in turn, is pivoted on the frame 40 at 58. The arm 57 includes an auxiliary arm 59 to which is connected one end of a tension spring 60, the other end of the spring being connected to one end of a lever 61 which is also pivotally connected to the arm 57 at 58. The other end of this lever engages the gate 33 and biases the gate counterclockwise toward the position shown in phantom in Fig. 3. Whenever an article, such as a pan strap 62, Fig. 3, on the inlet conveyor 21 engages the gate 33, the pressure of the article against the gate rotates the gate into the position shown in solid lines in Fig. 3 and in opposition to the action of the spring 60. The purpose of this mounting of the gate 33 will be discussed hereinafter. The arm 57 on which the gate 33 is pivotally mounted carries a roller 65 which is engageable by a cam 66 mounted on a shaft 67 carried by the frame 40. The cam 66 is provided with a raised portion 68 which engages the roller 65 once for each revolution of the cam to move the arm 57 and the gate 33 upwardly, thereby extending the gate into the path of an article on the inlet conveyor 21. As the cam 66 continues to rotate, the roller 65 on the arm 57 disengages the raised portion 68 of the cam to permit the gate 33 to move downwardly into its retracted position wherein it is out of the path of an article on the inlet conveyor. Thus, the cam 66 serves as means for moving the gate 33 between its extended and retracted positions, the gate being adapted to pass an article to the transfer means 27 each time it is retracted by the cam 66.

Considering the actuating means 35 for the driven rolls 26, the transfer means 27 and the escapement means 30, the actuating means includes an electric motor 71 which is mounted on the frame 40. The motor shaft carries a sprocket 72 around which is trained a chain 73, this chain also being trained around a sprocket 74 which is connected to a shaft 75 through a flexible coupling 76, the shaft 75 being carried by suitable bearings on the frame 40. A sprocket 77 is eccentrically mounted on the shaft 75 so as to vary the lineal speed of the chain 78 between a maximum and a minimum during each revolution of the shaft 75, the reason for this being discussed hereinafter. The chain 78 is also trained around a sprocket 79 fixed on a shaft 80 which is carried by suitable bearings on the frame. Additionally, the chain 78 is trained around sprockets 81 and 82, the former being rotatably mounted on a shaft 83 which carries a pivoted arm 84, the sprocket 82 being rotatably mounted on the other end of this arm. As will be apparent, the arm 84 may swing back and forth about the shaft 83 to compensate for the eccentricity of the sprocket 77.

Carried by the shaft 80 is another sprocket 88 around which is trained a chain 89, this chain also being trained around a sprocket 90 on the shaft 47 of the transfer means 27.

Thus, the motor 71 drives the transfer means 27 through the sprocket and chain system thereinbefore described. The eccentricity of the sprocket 77 is such that the sweep 29 moves relatively slowly as it begins to cross the inlet conveyor 21 so that, when the sweep engages an article to be transferred to the outlet conveyor 22, it engages the article with a minimum of jarring or jolting. This is a particularly important feature where delicate articles, or articles with delicate contents, such as raised dough, are involved. Thereafter, as the eccentric sprocket 77 continues to rotate, larger and larger radii thereof come into effect to increase the lineal speed of the chain 78, thereby accelerating the sweep 29, after it has engaged an article, from the relatively low speed to a relatively high speed to effect the transfer of the article from the inlet conveyor 21 to the outlet conveyor 22 in the minimum possible time, which is an important feature. Thus, the eccentric sprocket 77 serves as a variable-speed drive means for the transfer means 27 which has the effect of accelerating the sweep 29 from a relatively low speed to a relatively high speed as it moves across the inlet conveyor, thereby minimizing jolting of an article being transferred and minimizing the time required to transfer the article.

The shaft 80 also carries a sprocket 91 around which is trained a chain 92, the latter also being trained around a sprocket 93 connected to a gear box 94 so that this gear box is also driven by the eccentric sprocket 77. The gear box 94 drives a sprocket 95 around which is trained a chain 96, the latter also being trained around a sprocket 97 on a shaft 98. This shaft is rotatably mounted on the frame 40 in any suitable manner and fixed thereto is a sprocket 99 around which is trained a chain 100. The chain 100 is trained around various idling sprockets 101 suitably mounted on the frame 40, and engages all of the sprockets 42 connected to the respective driven rolls 26. Thus, the driven rolls are all driven in unison. Since the driven rolls 26 are driven through the eccentric sprocket 77, their speed also varies between a maximum and a minimum, the speed of the driven rolls being a minimum when the speed of the transfer means 27 is a minimum and being a maximum when the speed of the transfer means is a maximum. Thus, when the transfer means 27 is accelerated to discharge an article onto the outlet conveyor 22 rapidly, the driven rolls 26 are also accelerated so as to pass the next article to the transfer means rapidly, thereby effecting transfer in a minimum of time. Also, the maximum speed of the conveyor section formed by the driven rolls 26 exceeds the speed of the conveyor section formed by conveying elements 102 of the inlet conveyor 21 so that, as each article is passed by the escapement means 30, it is pulled away from the succeeding article to provide a space into which the gate 33 may extend to intercept the succeeding article. Thus, the rolls 26 serve as a spacing means also.

The gear box 94 also drives a sprocket 106 around which is trained a chain 107, the latter also being trained around a sprocket 108 which is fixed on the shaft 67 carrying the cam 66. Thus, the cam 66 for retracting and extending the gate 33 and the transfer means 27 are driven in timed relation so that, as soon as one article has been transferred by the transfer means, another article is passed to the transfer means by the gate 33, which is an important feature.

The conveyor system 20 includes an electrical control system which is shown diagrammatically in Fig. 6 of the drawings and the various elements of which are shown structurally in Figs. 2 to 5. Considering the electrical control system in more detail, it includes switches 111, 112 and 113, the switches 111 and 112 being connected in parallel with respect to each other and in series with the motor 71. The switch 113 is connected in series with the motor 71 and with the parallel-connected switches 111 and 112. The switch 111 is mounted on the frame 40 adjacent the gate 33 and is held open by an arm 114, which is connected to the gate 33, as long as no article is bearing against the gate so that the gate is in the broken line position of Fig. 3. As soon as an article bears against the gate to move it to the position shown in Fig. 5, the arm 114 permits the switch 111 to close. The switch 112 is mounted on the frame 40 and is actuable by an arm 115 on the cam shaft 67. The switch 112 is normally closed and is opened by the arm 115 once per revolution. The switch 113 is also mounted on the frame and is actuable by an arm 116 on a shaft 117, the latter being driven by a sprocket 118 having trained therearound a chain 119 which is also trained around a sprocket 120 on the cam shaft 67. The diameter ratio of the sprockets 118 and 120 is such that the switches 112 and 113 are opened by the arms 115 and 116 simultaneously at the end of a predetermined number of revolutions of the cam shaft 67. For example, a 4:1 ratio may be employed so that the switch 113 is opened by the arm 116 after four revolutions of the cam shaft 67, corresponding to the passing of four articles by the escapement 30 to the transfer means 27.

Figure 5:
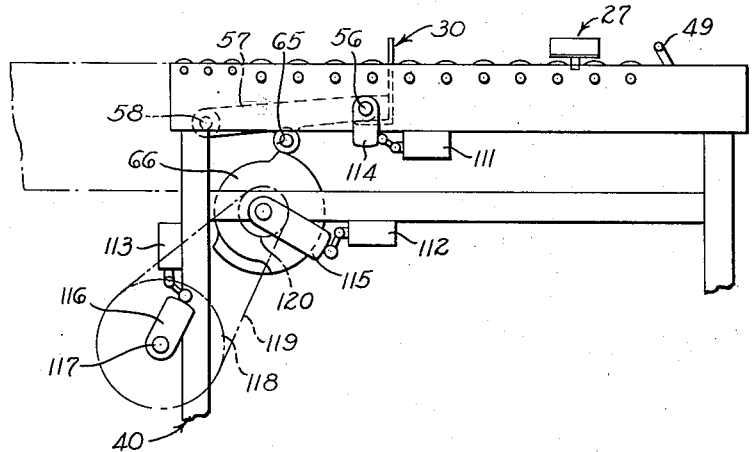
Fig. 5 is a semi-diagrammatic elevational view taken as indicated by the arrowed line 5—5 of Fig. 4.

Considering the over-all operation of the conveyor system 20, it will be assumed that the first of a series of articles on the inlet conveyor 21 is bearing against the gate 33 and that the arms 115 and 116 are in the positions shown in Fig. 5. Under such conditions, the switch 111 is closed and the switches 112 and 113 are open. The motor 71 may then be started in any suitable manner, as by closing a switch 121 in parallel with the switch 113, the switch 121 being actuated manually, or by other apparatus, not shown, receiving articles from the outlet conveyor 22. Under such conditions, the motor 71 starts the escapement means 30 and the transfer means 27 in operation, the gate 33 being retracted to permit an article to pass to the transfer means. Thereupon, the article is engaged by the sweep 29 of the transfer means, the sweep accelerating from a relatively low speed to a relatively high speed to minimize jarring of the article and to minimize the time required to effect the transfer to the outlet conveyor 22. As soon as the first article has been passed by the escapement means 30, the gate 33 is again extended to intercept the next article, which moves the gate into a position such that the switch 111 is closed. At the end of the cycle, the arm 115 engages the switch 112 to open it, but, since the switch 111 has been closed by an article pressing against the gate 33, the operating cycle is repeated to permit the second article to be passed to the transfer means and to be transferred to the outlet conveyor 22 thereby. However, if no article is pressing against the gate 33 when the arm 115 opens the switch 112, the motor 71 remains de-energized until such time as an article presses against the gate to close the switch 111. Thus, the switch 111 serves as a means for preventing retraction of the gate 33 in the event that no article is pressing thereagainst. In the absence of the switch 111, an article arriving slightly late would be passed by the escapement means and might strike the sweep 29, with the possibility of resultant damage. However, by making operation of the escapement means 30 and the transfer means 27 contingent upon the presence of an article at the gate, such a possibility is avoided. In other words, this feature insures perfect synchronism between the operation of the transfer means 27 and the feeding of articles thereto, which is an important feature.

After a predetermined number of articles, such as four, has been transferred to the outlet conveyor 22, the arm 116 opens the switch 113 to interrupt operation of the escapement means 30 and the transfer means 27 until such time as the switch 121 is closed, thus providing a counting means for transferring articles to the outlet conveyor in groups. For example, the outlet conveyor 22 may lead to apparatus, not shown, for loading an oven which is capable of receiving four pan straps abreast. After the loading apparatus has loaded the four pan straps into the oven, it may actuate the switch 121 to start the transferring apparatus in operation again to repeat the foregoing sequence of events. Alternatively, the switch 121 may be actuated in other ways, or, if delivery of articles in groups is not desired, the switches 113 and 121 may be omitted entirely.

It will be understood that if there is any gap in the stream of articles being transported by the inlet conveyor 21, the first article in a succession following the gap will be moved into engagement with the gate 33 by the section of the inlet conveyor 21 which is upstream from the section 24 thereof, this upstream section preferably operating continuously so that it will push the first article in the succession following the gap across the three or four driven rolls 26 between the idling rolls 25 and the gate 33.

Referring to Figs. 7 to 10 of the drawings, illustrated therein is a conveyor system 130 of the invention which includes two aligned inlet conveyors 131 and 132 running toward each other, these conveyors being carried by a frame 133. Also carried by the frame and disposed between the two inlet conveyors 131 and 132 are a plurality of gravity or idling rolls 134, the idling rolls being common to the two inlet conveyors and being regarded hereinafter as forming part of each. An article delivered by the inlet conveyor 131 onto the idling rolls 134 has sufficient momentum to move completely onto the idling rolls, the same being true of an article delivered by the inlet conveyor 132. Extending transversely of the inlet conveyors 131 and 132 and registering with the idling rolls 134 thereof is an outlet conveyor 135, the directions of movement of the articles transported by the three conveyors 131, 132 and 135 being as indicated by the arrows 136.

Movable transversely of the inlet conveyors 131 and 132 and in the direction of movement of the outlet conveyor 135 is a transfer means 137 which is illustrated as including one or more sweeps 138 carried by endless chains 139. The upper runs of the chains 139 are disposed between pairs of the idling rolls 134 so that they do not interfere with movement of articles from the inlet conveyors 131 and 132 onto the idling rolls, the sweeps 138 being disposed above the idling rolls during the upper run of their movement.

In order to limit movement of articles delivered to the transfer means 137 by the inlet conveyors 131 and 132, the conveyor system 130 includes stops 141 and 142 which are movable between extended and retracted positions in alternating relation in a manner to be described so that the stop 141 is extended and the stop 142 retracted when an article is delivered by the inlet conveyor 131 and, similarly, the stop 141 is retracted and the stop 142 is extended when an article is delivered by the conveyor 132. The stops 141 and 142 are interconnected by a lever 143 which is pivoted for rocking movement at 144.

Associated with the respective inlet conveyors 131 and 132 upstream from the transfer means 137 are escapement means 151 and 152 each adapted to pass one article at a time to the transfer means. The two escapement means 151 and 152 operate in alternating relation and in timed relation with the stops 141 and 142 and the transfer means 137 so that articles are delivered to the transfer means by the inlet conveyors 131 and 132 in alternating relation.

Considering the conveyor system 130 in more detail, the inlet conveyor 131 includes endless conveying elements 153 trained around a roll or drum 154 which is carried by a shaft 155 journalled in suitable bearings carried by the frame 133, the shaft 155 also carrying a drive sprocket 156. Similarly, the inlet conveyor 132 includes endless conveying elements 157, a drum 158, a shaft 159 and a drive sprocket 160.

The transfer means 137, as hereinbefore suggested, includes two endless chains 139, each chain being trained at one end around a sprocket 164 and at its other end around a sprocket 165. The sprockets 164 are fixed on a shaft 166 journalled in suitable bearings on the frame 133, and the sprockets 165 are carried by a shaft 167 also journalled in suitable bearings on the frame, the shaft 167 also carrying a drive sprocket 168.

The escapement means 151 and 152 respectively associated with the inlet conveyors 131 and 132 respectively include gates 171 and 172 disposed between the conveying elements of the inlet conveyors 131 and 132 and respectively pivotally connected to arms 173 and 174 which are pivotally connected to the frame 133 at 175 and 176, respectively. The arm 173 and 174 carry cam following rollers 177 and 178, respectively, these rollers engaging cams 179 and 180, respectively. The cams 179 and 180 are respectively mounted on shafts 181 and 182 which are journalled in suitable bearings carried by the frame 133, the shafts 181 and 182 having drive sprockets 183 and 184 thereon, respectively.

As the cams 179 and 180 rotate, they move the gates 171 and 172 between extended and retracted positions in substantially the same manner as the cam 66 previously described moves the gate 33 between extended and retracted positions. However, the cams 179 and 180 are 180° out of phase so that the gate 171 is extended when the gate 172 is retracted, and vice versa. Thus, the escapement means 151 and 152 operate in alternating relation to pass articles from the inlet conveyors 131 and 132 to the transfer means 137 in alternating relation.

As best shown in Fig. 8, associated with the gate 172 is a latch means for preventing retraction of the gate in the event that no article is pressing thereagainst when the cam 180 rotates into a position to permit retraction of the gate. This latch means includes a latch member 190 which intercepts the gate 172 as it tends to drop toward its retracted position if the gate 172 has not been rotated into an inclined position, shown in solid lines, by the pressure of an article thereagainst. A compression spring 191 engaging the gate 172 acts thereon to bias it toward the broken line position shown in Fig. 8, which position the gate 172 assumes if no article on the conveyor 132 is pressing thereagainst. Consequently, with the gate 172 in the broken line position shown in Fig. 8, if the cam 180 rotates into a position to retract this gate, the latch member 190 intercepts the gate to prevent retraction thereof. Thus, the latch member 190 prevents passage of an article from the conveyor 132 to the transfer means 137 unless the article is bearing against the gate 172 at the proper point in the operating cycle. This prevents an article arriving slightly late from being passed to the transfer means with the possibility that it might strike one of the sweeps 138.

Similar considerations are applicable to the gate 171, this gate being provided with a latching means which is also releasable in response to pressure of an article against the gate, this latching means including a latch member 192 and the gate being biased toward its latched position by a compression spring 193.

This gate and latching means structure is the subject of my copending application Serial No. 187,861, filed October 2, 1950, reference to which is hereby made.

In order to prevent articles intercepted by the gates 171 and 172 from bouncing back, and thus failing to exert the pressure against the gates necessary to release the latching means associated therewith, I provide depressible spring clips 195 and 196 respectively spaced from the gates 171 and 172 distances substantially equal to the lengths of articles being handled. As will be apparent, articles encountering the spring clips 195 and 196 will depress same and the spring clips will move upwardly to keep the articles from bouncing back after the articles have passed thereover.

The gates 171 and 172 are provided with lugs 201 and 202, respectively, which are adapted to engage arms 203 and 204, respectively, on the lever 143 carrying the stops 141 and 142. As the gate 171, for example, moves to its retracted position, the lug 201 thereon engages the arm 203 to rock the lever 143 into a position such that the stop 141 for limiting movement of an article delivered by the inlet conveyor 131 is moved to its extended position. Similarly, the stop 142 for limiting movement of an article delivered to the transfer means 137 by the inlet conveyor 132 is moved to its extended position by engagement of the lug 202 on the gate 172 with the arm 204 on the lever 143 when the gate 172 moves to its retracted position. Thus, the stops 141 and 142 are moved between their extended and retracted positions in alternating relation and in timed relation with the alternating operation of the gates 171 and 172. Friction at the pivot 144 for the lever 143 will ordinarily be sufficient to retain the stops 141 and 142 in the desired positions, although additional means, not shown, for this purpose may be provided if desired.

Considering the actuating means for the various elements of the conveyor system 130, it includes an electric motor 210 which drives a sprocket 211, Fig. 10, a chain 212 being trained around the sprocket 211 and around a sprocket 213 on a shaft 214 which is carried by suitable bearings on the frame 133. The shaft 214 drives gear boxes 215 and 216 which, in turn, drive sprockets 217 and 218, respectively. Trained around the sprocket 217 and the drive sprocket 156 for the inlet conveyor 131 is a chain 219, and trained around the sprocket 218 and the drive sprocket 160 for the inlet conveyor 132 is a chain 220. Also carried by the shaft 214 is a sprocket 221 around which is trained a chain 222, this chain also being trained around the drive sprocket 168 for the transfer means 137. The shaft 214 further carries sprockets 225 and 226 around which are trained chains 227 and 228, respectively, these chains being trained around sprockets 229 and 230, respectively, of gear boxes 231 and 232, respectively. These gear boxes drive sprockets 233 and 234, respectively, around which are trained chains 235 and 236, respectively, these chains also being trained around the drive sprockets 183 and 184, respectively, for the cams 179 and 180. Thus, all of the various elements of the conveyor system 130 are driven in timed relation by the motor 210 through the various mechanisms heretofore described.

Considering the over-all operation of the conveyor system 130, it will be assumed that the motor 210 is operating and that files of articles are on the inlet conveyors 131 and 132. With the various elements of the conveyor system in the positions shown in Fig. 8 of the drawings, the gate 172 has been retracted to permit passage of an article to the transfer means 137 to be engaged by one of the sweeps 138 of the transfer means and to be transferred to the outlet conveyor 135. Subsequently, the cam 180 extends the gate 172 to intercept the next article on the conveyor 132 and, at the same time, the cam 179 rotates to a position to retract the gate 171. If an article is pressing against the gate 171, the gate will move past the latch member 192 and into its retracted position to permit passage of the article to the transfer means. Otherwise, the gate 171 will not retract. Thereafter, the cam 179 rotates to a position to extend the gate 171 and the cam 180 moves to a position to permit the gate 172 to retract again, provided an article is pressing thereagainst. If no article is pressing against the gate 172 it will, of course, be prevented from retracting by the latch member 190. Thus, the gates 171 and 172 feed articles to the transfer means 137 in timed relation with the operation of the transfer means, each gate skipping a beat whenever no article is pressing thereagainst at the time its cam permits it to retract.

As each gate moves to its retracted position, it rocks the lever 143 carrying the stops 141 and 142 into a position to bring the corresponding stop into its extended position and the other stop into its retracted position. For example, as the gate 171 moves into its retracted position, it extends the stop 141 for limiting movement of an article delivered to the transfer means by the inlet conveyor 131, and, at the same time, retracts the stop 142 to permit passage of the article thereover. The gate 172 accomplishes the reverse effect.

Thus, the conveyor system 130 alternately transfers articles from the inlet conveyors 131 and 132 to the outlet conveyor 135, this alternating relation obtaining so long as continuous streams of articles arrive at the two escapement means 151 and 152. If there is a gap in one of the streams of articles, the system will continue to transfer articles from the other inlet conveyor to the outlet conveyor until such time as the gap disappears.

Referring to Figs. 11 to 13 of the drawings, illustrated therein is a conveyor system 250 of the invention which includes two inlet conveyors 251 and 252 arranged side by side and respectively including sections 253 and 254 composed of rolls 255 and 256. Registering with the rolls 255 and 256 forming the downstream ends of the inlet conveyor sections 253 and 254 and extending transversely of such inlet conveyor sections is an outlet conveyor 257, the conveyor system 250 including a transfer means 258 movable across the inlet conveyor sections 253 and 254 and in the direction of movement of the outlet conveyor 257 for transferring articles from the inlet conveyors to the outlet conveyor, the directions of movement of the articles being as indicated by the arrows 259. Associated with the respective inlet conveyors 251 and 252 upstream from the transfer means 258 are alternately operable escapement means 261 and 262, these escapement means being adapted to pass one article at a time and, as indicated, being alternately operable so that articles are passed one at a time from the inlet conveyors 251 and 252 in alternating relation.

Considering the conveyor system 250 in more detail, it includes a frame 265 having frame members 266 which carry the rolls 255 and 256. The transfer means 258 includes a sweep 267 carried by a chain 268 trained around sprockets 269 only one of which is visible in Fig. 12 of the drawings. The upper run of the chain 268 is disposed between a pair of the rolls 255 and an aligned pair of the rolls 256 and is disposed below the upper surfaces of the rolls so that only the sweep 267 engages the article in the path of the transfer means. One of the sprockets 269 of the transfer means 258 is mounted on a shaft 270 which carries a drive sprocket 271, this drive sprocket having trained therearound a chain 272 which is also trained around a sprocket 273 driven from a gear box 274. The mechanism within the gear box 274 may be driven in any suitable manner, as by a chain 275 trained around a sprocket 276.

The escapement means 261 and 262 respectively include gates 281 and 282 disposed between pairs of the rolls 255 and 256, respectively. The gates 281 and 282 are pivotally mounted on arms 283 and 284, respectively, and are biased counterclockwise by rat trap springs 285 and 286, respectively. The arms 283 and 284 are pivotally connected to the frame 265 and are respectively provided with cam following rollers 287 and 288 which engage cams 289 and 290, respectively, these cams being mounted on a shaft 291 having a drive sprocket 292 which is driven by a sprocket 293 on the gear box 274 through a chain 294. The cams 289 and 290 are 180° out of phase so that the gates 281 and 282 are moved between their extended and retracted positions in alternating relation so as to pass articles from the inlet conveyors 251 and 252 to the transfer means 258 in alternating relation. It will be noted that the transfer means 258 and the two escapement means 261 and 262 are all driven from the same gear box 274 so that they are operated in timed relation.

The gates 281 and 282 are provided with latching means for preventing retraction thereof in the event that no article on the corresponding inlet conveyor is pressing thereagainst, the latching means including latches 297 and 298 into which the respective gates 281 and 282 drop to prevent retraction in the event that the gates are not biased clockwise by articles pressing thereagainst in opposition to the action of the springs 285 and 286.

Considering the over-all operation of the conveyor system 250 as thus far described, it will be assumed that streams of articles are being transported by the inlet conveyors 251 and 252 and that the first article in each stream is pressing against the corresponding one of the gates 281 and 282. Consequently, when the cam 289 rotates to a position to retract the gate 281, the article pressing against this gate biases it clockwise so that it clears the corresponding latch 297 and moves into its retracted position. Consequently, this article passes to the transfer means 258 and is transferred thereby to the outlet conveyor 257. Subsequently, the cam 289 extends the gate 281 again in time to intercept the next article on the inlet conveyor 251, and the cam 290 moves to a position to retract the gate 282. Since an article on the conveyor 252 is pressing against the gate 282, it rotates it clockwise so that the gate clears the corresponding latch 298 and moves into its retracted position to permit passage of the article to the transfer means, which transfers it to the outlet conveyor. This process is repeated over and over again so long as continuous streams of articles are on the inlet conveyors. In the event that there is a gap in one of the streams, the corresponding gate will not retract until such time as the gap disappears. Thus, under such conditions, articles will be passed to the transfer means by the other conveyor only, and at one half the normal rate.

The conveyor system 250 also includes a counting means 300 for counting the number of articles passed by the two escapement means 261 and 262. More particularly, the counting means includes a shaft 301 on which are disposed two ratchet wheels only one of which is visible and is identified by the numeral 304. In the particular construction illustrated, each ratchet wheel is shown as having twelve teeth to provide twelve increments of rotation of the shaft 301. Pawls 305 and 306 are pivoted on the shaft 301 and act on the respective ratchet wheels, these pawls being connected to the gate arms 283 and 284, respectively, by pivoted links 307 and 308, respectively.

The linkages connecting the gate arms 283 and 284 to the pawls 305 and 306 are so designed that each time one of the gates 281 and 282 is retracted, the shaft 301 is rotated 1/12 of a revolution in the particular construction illustrated. Thus, whenever twelve articles are passed by the two escapement means 261 and 262, the shaft 301 is rotated through one complete revolution, it being immaterial whether the two escapement means pass the same number of articles, or different numbers.

Thus, with the construction described, the conveyor system 250 transfers articles to the outlet conveyor 257 in batches of twelve and, when twelve articles have been transferred, the conveyor system may be de-energized until such time as the twelve articles are disposed of by some other apparatus, not shown, such as an oven loading apparatus. For this purpose, the shaft 301 is provided with an arm 309 which opens a switch 310 at the end of each revolution of the shaft 301, which corresponds to a transfer of twelve articles with the particular construction illustrated.

It will be understood that a counting means similar to the counting means 300 may be incorporated in the other embodiments hereinbefore disclosed also if desired.

Although I have disclosed various exemplary embodiments of my invention herein for purposes of illustration, it will be understood that various changes, modifications and substitutions may be incorporated therein without necessarily departing from the spirit of the invention.

I claim as my invention:

1. In a conveyor system, the combination of: an inlet conveyor; an outlet conveyor extending transversely of said inlet conveyor and adapted to receive articles therefrom; transfer means movable transversely of said inlet conveyor and in the direction of movemement of said outlet conveyor for transferring successive articles from said inlet conveyor to said outlet conveyor; escapement means associated with said inlet conveyor upstream from said transfer means for passing one article at a time to said transfer means; and actuating means operatively connected to said transfer means and to said escapement means for operating said transfer means and said escapement means in timed relation, said actuating means including variable-speed drive means operatively connected to said transfer means for accelerating said transfer means from a relatively low speed to a relatively high speed as it crosses said inlet conveyor so as to minimize jarring of articles transferred from said inlet conveyor to said outlet conveyor as the articles are engaged by said transfer means.

2. A conveyor system as defined in claim 1 wherein said escapement means includes a gate movable between an extended position wherein it is adapted to intercept an article being transported by said inlet conveyor and a retracted position wherein it is out of the path of an article being transported by said inlet conveyor, said actuating means including means operatively connected to said gate for moving said gate between said extended and retracted positions in timed relation with the movement of said transfer means across said inlet conveyor.

3. In a conveyor system, the combination of: an inlet conveyor having an inlet conveyor section which includes spaced, parallel conveyor elements extending transversely of said inlet conveyor; an outlet conveyor extending transversely of said inlet conveyor in registry with a plurality of conveyor elements of said inlet conveyor section and adapted to receive articles therefrom; transfer means between said parallel conveyor elements movable transversely of said inlet conveyor section and in the direction of movement of said outlet conveyor for slidably tranferring successive articles supported on a plurality of said conveyor elements from said inlet conveyor section to said outlet conveyor, said transfer means including a sweep movable transversely of said inlet conveyor section above said conveyor elements; and variable-speed drive means common to and operatively connected to said transfer means and said conveyor elements for accelerating said transfer means from a relatively low speed to a relatively high speed as it crosses said inlet conveyor section and simultaneously accelerating the speed of the spaced, parallel conveyor elements of said inlet conveyor.

4. A conveyor system according to claim 3 wherein said transfer means includes an endless chain carrying said sweep, said endless chain extending transversely of said inlet conveyor section with its upper run at a level below the upper surface of said inlet conveyor section.

5. In a conveyor system, the combination of: inlet and outlet conveyors intersecting at an angle, said outlet conveyor being adapted to receive articles from said inlet conveyor; transfer means movable transversely of said inlet conveyor and registering with said outlet conveyor for transferring successive articles from said inlet conveyor to said outlet conveyor; escapement means upstream from said transfer means for passing one article at a time to said transfer means, said escapement means including a gate which is movable between an extended position wherein it is disposed in the path of an article on said inlet conveyor to intercept same and a retracted position wherein it is out of the path of an article on said inlet conveyor; actuating means operatively connected to said transfer means and said escapement means for operating said transfer means and said escapement means in timed relation; and means responsive to the pressure of an article on said inlet conveyor against said gate to render said actuating means effective for retraction of said gate and for rendering said actuating means ineffective for retraction of said gate if no article is being pressed against said gate by said inlet conveyor, the means last defined including switch means engageable and actuatable by said gate in response to pressure thereagainst by an article on said inlet conveyor and connected in circuit with said actuating means to control energization of said actuating means.

6. A conveyor system as defined in claim 5 including means for spacing an article being passed by said escapement means from a following article.

7. In a conveyor system, the combination of: an inlet conveyor; an outlet conveyor extending transversely of said inlet conveyor and adapted to receive articles therefrom; transfer means movable transversely of said inlet conveyor and in the direction of movement of said outlet conveyor for transferring successive articles from said inlet conveyor to said outlet conveyor, said transfer means including a sweep carried by an endless chain; and actuating means operatively connected to said transfer means for accelerating said sweep from a relatively low speed to a relatively high speed as it crosses said inlet conveyor so as to minimize jarring of an article being transferred from said inlet conveyor to said outlet conveyor as it is engaged by said sweep, said actuating means including an eccentric drive sprocket around which is trained a chain operatively connected to said transfer means.

8. In a conveyor system, the combination of: inlet conveyor means; an outlet conveyor extending transversely of said inlet conveyor means and adapted to receive articles therefrom; transfer means movable transversely of said inlet conveyor means and in the direction of movement of said outlet conveyor for transferring successive articles from said inlet conveyor means to said outlet conveyor; escapement means associated with said inlet conveying means upstream from said transfer means for passing one article at a time to said transfer means; and actuating means operatively connected to said transfer means and to said escapement means for operating said transfer means and said escapement means in timed relation, said actuating means including variable-speed drive means operatively connected to said transfer means for accelerating said transfer means from a relatively low speed to a relatively high speed as it crosses said inlet conveyor means so as to minimize jarring of articles transferred from said inlet conveyor means to said outlet conveyor as the articles are engaged by said transfer means.

References Cited in the file of this patent

UNITED STATES PATENTS

| | | |
|---|---|---|
| 753,293 | McMurtry | Mar. 1, 1904 |
| 1,461,465 | Stebler | July 10, 1923 |
| 1,609,802 | Ekstrom et al. | Dec. 7, 1926 |
| 1,737,762 | Howe | Dec. 2, 1929 |
| 1,813,130 | Ahnger | July 7, 1931 |
| 1,848,609 | Enock | Mar. 8, 1932 |
| 1,900,563 | Keller | Mar. 7, 1933 |
| 1,980,411 | Kimball et al. | Nov. 13, 1934 |
| 2,047,406 | Copping | July 14, 1936 |
| 2,371,926 | Schmitt | Mar. 20, 1945 |
| 2,380,172 | Harber | July 10, 1945 |
| 2,536,250 | Archer | Jan. 2, 1951 |
| 2,576,369 | Sticelber | Nov. 27, 1951 |
| 2,603,339 | Malhiot | July 15, 1952 |
| 2,640,578 | Schroenghamer | June 2, 1953 |